United States Patent [19]

Cook et al.

[11] Patent Number: 4,696,785
[45] Date of Patent: Sep. 29, 1987

[54] TESTABLE VOTED LOGIC POWER CIRCUIT AND METHOD OF TESTING THE SAME

[75] Inventors: Bruce M. Cook; Jerzy Gutman, both of Plum Boro, Pa.

[73] Assignee: Westinghouse Electric Corp., Pittsburgh, Pa.

[21] Appl. No.: 793,383

[22] Filed: Oct. 31, 1985

[51] Int. Cl.$^4$ .............................................. G21C 17/00
[52] U.S. Cl. .................................... 376/245; 376/215; 376/259; 324/415; 340/660; 340/664; 371/36
[58] Field of Search ............... 376/215, 216, 217, 245, 376/259; 340/660, 664; 324/73 R, 415; 371/36

[56] References Cited

U.S. PATENT DOCUMENTS

| | | | |
|---|---|---|---|
| 3,115,451 | 12/1963 | Strong et al. | 376/215 |
| 3,223,590 | 12/1965 | Troeger | 376/215 |
| 3,424,652 | 1/1969 | Oehmann | 376/259 |
| 3,425,903 | 2/1969 | Bevilacqua | 376/259 |
| 3,437,556 | 4/1969 | Bevilacqua et al. | 340/660 |
| 3,467,956 | 9/1969 | Moreines | 324/415 |
| 3,748,540 | 7/1973 | Eggenberger et al. | 324/73 R |
| 3,892,954 | 7/1975 | Neuner | 340/664 |
| 3,967,257 | 6/1976 | Hager | 340/664 |
| 4,184,514 | 1/1980 | Ryan et al. | 376/215 |
| 4,338,650 | 8/1982 | Wierschke . | |
| 4,427,620 | 1/1984 | Cook | 376/259 |
| 4,447,851 | 5/1984 | Simmons | 376/259 |
| 4,587,077 | 5/1986 | Bessedine | 376/259 |

FOREIGN PATENT DOCUMENTS 2494034 11/1981 France .

OTHER PUBLICATIONS

Fault Tolerance in Continuous Process Control William F. McGill, et al.

*Primary Examiner*—Salvatore Cangialosi
*Attorney, Agent, or Firm*—Daniel C. Abeles

[57] ABSTRACT

In a protection system for a complex process control system which generates three independent actuation signals, the power circuit includes three pairs of switches arranged in three groups connected in series with each other and with a load device and a voltage source. Each group of switches includes two switches selected from different pairs of switches and connected in parallel. The same circuit topography is used for normally energized and normally deenergized loads with normally closed siwtches used with the former and normally open switches used with the latter. For testing the circuit, each group of switches is shunted by a resistor to form a leakage path through the configuration of switches. The impedance of each resistor is several times that of a closed switch such that the leakage current is insufficient to energize the load, but sufficient to be detected by a current detector which measures the current drawn from the voltage source. Actuation of each switch has an observable effect on the detected current, and thus the circuit may be tested by selective actuation of the switches without changing the circuit topography and while maintaining the protection function, all without susceptibility to any single failure. In addition, by monitoring the current continuously, the failure of any switch can be detected at the time it occurs.

12 Claims, 4 Drawing Figures

TESTABLE VOTED LOGIC POWER CIRCUIT AND METHOD OF TESTING THE SAME

CROSS-REFERENCE TO RELATED APPLICATIONS

Commonly owned U.S. patent application entitled "A Voted Logic Power Interface with Tester" concurrently filed in the name of Robert E. Hager and identified by assignee's Ser. No. 793,382 filed Oct. 31, 1985.

Commonly owned U.S. patent application entitled "Testable Fault-Tolerant Power Interface Circuit for Normally De-Energized Loads", concurrently filed in the name of Robert E. Hager and identified by assignee's Ser. No. 793,381 filed Oct. 31, 1987.

Commonly owned U.S. patent application entitled "Self-Compensating Voted Logic Power Interface with Tester", concurrently filed herewith in the name of Henry F. Cook and identified by assignee's Ser. No. 793,422 filed Oct. 31, 1985.

BACKGROUND OF THE INVENTION

1. Field of the Invention

The invention is directed to protection systems used to provide reliable automatic responses to abnormal conditions in complex processes, such as nuclear power plants, and to apparatus and a method for testing such protection systems. More specifically, it is directed to voted logic power circuits for such a protection system which can be used with normally energized or normally deenergized protection devices and to a tester which tests each switching component of the power circuit while maintaining the protection function.

2. Prior Art

Protection systems for complex processes monitor selected process parameters, such as temperatures, pressures and flows, and the status of various components such as whether a valve is open or closed or whether a pump is on or off, and provide automatic responses to measured values of the parameters and to detected status states of the components which require positive intervention to prevent, or to alleviate the effects of, abnormal process conditions. High reliability is an essential requirement for such a system. In order to enhance reliability, it is common practice to provide redundant sensors for each selected parameter and component status. It is also common practice to vote the responses of the redundant sensors, that is to require that a plurality, but not necessarily all, of the sensors, detect the abnormal condition before action is initiated in order to reduce the probability of a spurious actuation.

A nuclear power plant is one example of a complex process in which such a protection system is employed. The protection system in a nuclear power plant performs a plurality of functions. It can shutdown, or trip, the reactor if conditions warrant, or it can perform a number of engineered safeguard functions, such as opening or closing valves and turning on or off pumps or other components. Typically, the trip function involves deenergizing electromechanical jacks which normally hold control rods in a position withdrawn from the reactor core so that the rods reenter the core and cause it to go subcritical. The engineered safeguard functions may involve either deenergizing a load device which is normally energized or energizing a device which is normally deenergized. In a typical engineered safeguard function system, four redundant sensors are used to detect the selected parameters and/or status conditions. The response of each sensor is compared with a setpoint value to generate a digital signal which is referred to as a partial actuation signal since an indication from more than one sensor is required to actuate the safety component. The four partial actuation signals for each parameter or status condition are all fed to each of two identical, electrically isolated logic trains. Typically, this is accomplished by applying each partial actuation signal to the coil of a relay having one set of contacts in each logic train. Each logic train independently votes the partial actuation signals, such as two out of four, and generates an actuation signal. The two independently generated actuation signals are then applied to a power interface circuit which requires the presence of both actuation signals to actuate the load device, either a normally energized or normally deenergized component, to initiate the engineered safeguard function. Such a two out of two voting power interface can be disabled by a single failure in one of the two channels.

In testing these prior art protection systems, the sensor channels are tested individually one at a time by substituting test signals for the sensor signals. For safeguard functions in which the load can be momentarily actuated without adverse effects on the process, both logic trains are tested simultaneously which also tests the power interface. Where momentary actuation of the load cannot be tolerated, the logic trains are tested one at a time. In order to test the switches in the power interface, the switches are individually switched out of the power interface network and tested by a low impedance test circuit. Thus, the topography of the power interface circuit is changed to effect the test. With such a system then, the status of the components can only be checked by a specific test and there is no indication during operation of whether a component has failed or not.

A primary object of the present invention is to provide a protection system which is not disabled by a single failure even during testing.

Another important object of the invention is to provide such a system in which the same circuit topography can be used for both normally energized and normally deenergized switches.

Still another important object of the invention is to provide such a protection system in which the circuit topography does not have to be changed for testing.

Yet another important object of the invention is such a protection system which is continuously monitored for failures.

SUMMARY OF THE INVENTION

These and other objects are realized by the invention which is directed to protection systems for complex, non-linear process control systems in general and in particular to protection systems for nuclear reactors. According to one embodiment of such a protection system, a power circuit for actuating a load in response to any two out of three actuation signals, includes three pairs of switches connected in three groups of two switches each, with the two switches in each group each being associated with a different pair of switches and being connected in parallel. The three groups of switches are connected in series with each other and with the load across a voltage source. One of the actuation signals actuates each of the pairs of switches such that in the presence of any two actuation signals the load is actuated. The same circuit topography is used whether the load is a normally energized or normally deenergized device. For the normally deenergized device, the switches are normally open and are closed when actuated. Conversely, normally closed switches are used when the load is normally energized. Thus, for the normally energized load, the load is actuated by disconnecting it from the voltage source and the normally deenergized load is actuated by connecting it to the voltage source.

According to the invention, the power circuit is tested by shunting each group of switches with a resistor such that together the resistors form a leakage path through the network of switches. The value of the resistors is selected to be several magnitudes larger than that of a closed switch and such that the leakage current is insufficient to energize the load but sufficient that it can be detected by a current detector measuring the current flowing to the load. The power circuit is tested by generating one actuation signal at a time to actuate the associated pair of switches, one in each of two different groups of switches. The increase in current effected by the closing of normally open switches, or the decrease in current resulting from the opening of normally closed switches, is detected by the current detector. If one switch controlled by the actuation signal responds, but the other does not, the change in current is not as great and this also is detected. The power circuit remains operational while the test is being conducted and since the load will be actuated upon the generation of either of the remaining actuation signals, the system is not subject to any single failure.

Generation of the actuation signals and monitoring of the detected current can be placed under the control of an automatic tester. In addition, by monitoring the current, failure of any of the switches either during an actuation or a quiescent period can be detected at the time it occurs rather than waiting for a conventional system test.

Generally, the same basic configuration and method can be used for testing any power circuit in which the load is to be actuated by n out of m actuation signals. In such a power circuit, m sets of switches are arranged in a plurality of groups of switches connected in series with the load across the voltage source. Each group includes n switches connected in parallel, with each of the n switches in each group associated with a different one of said sets of switches. The number of groups of switches required is a function of the number of possible different combinations of switches taken from m sets n at a time. Thus, with m actuation signals each actuating one of the sets of switches, the load is actuated when n out of the m actuation signals are generated. As in the case of the two out of three logic discussed above, the load may be either normally energized or normally deenergized by utilizing normally closed or normally open switches, respectively. Each of the plurality of serially connected groups of switches is shunted by a resistor having an impedance which is several times that of a closed switch to form through the switching network a leakage path in which the current is insufficient to energize the load but large enough to be detected by the current detector. As the numbers m and n become larger, the relative effect of the failure of a single switch on the current becomes smaller and requires more sensitive equipment to detect.

When applied to a protection system for a nuclear reactor in which redundant sensors for selected parameters generate partial actuation signals which are all applied to three logic trains which in turn, each generate an actuation signal based upon a selected voting logic, the two out of three voted power circuit of this invention, with the testing feature, provides a system which can be monitored continuously for switch failure, can be tested without changing circuit topography, is not subject to single failure even during testing and can be used with either normally energized or normally deenergized loads.

BRIEF DESCRIPTION OF THE DRAWINGS

A full understanding of the invention can be gained from the following description when read in conjunction with the accompanying drawings in which.

DESCRIPTION OF THE PREFERRED EMBODIMENTS

Figure 1:
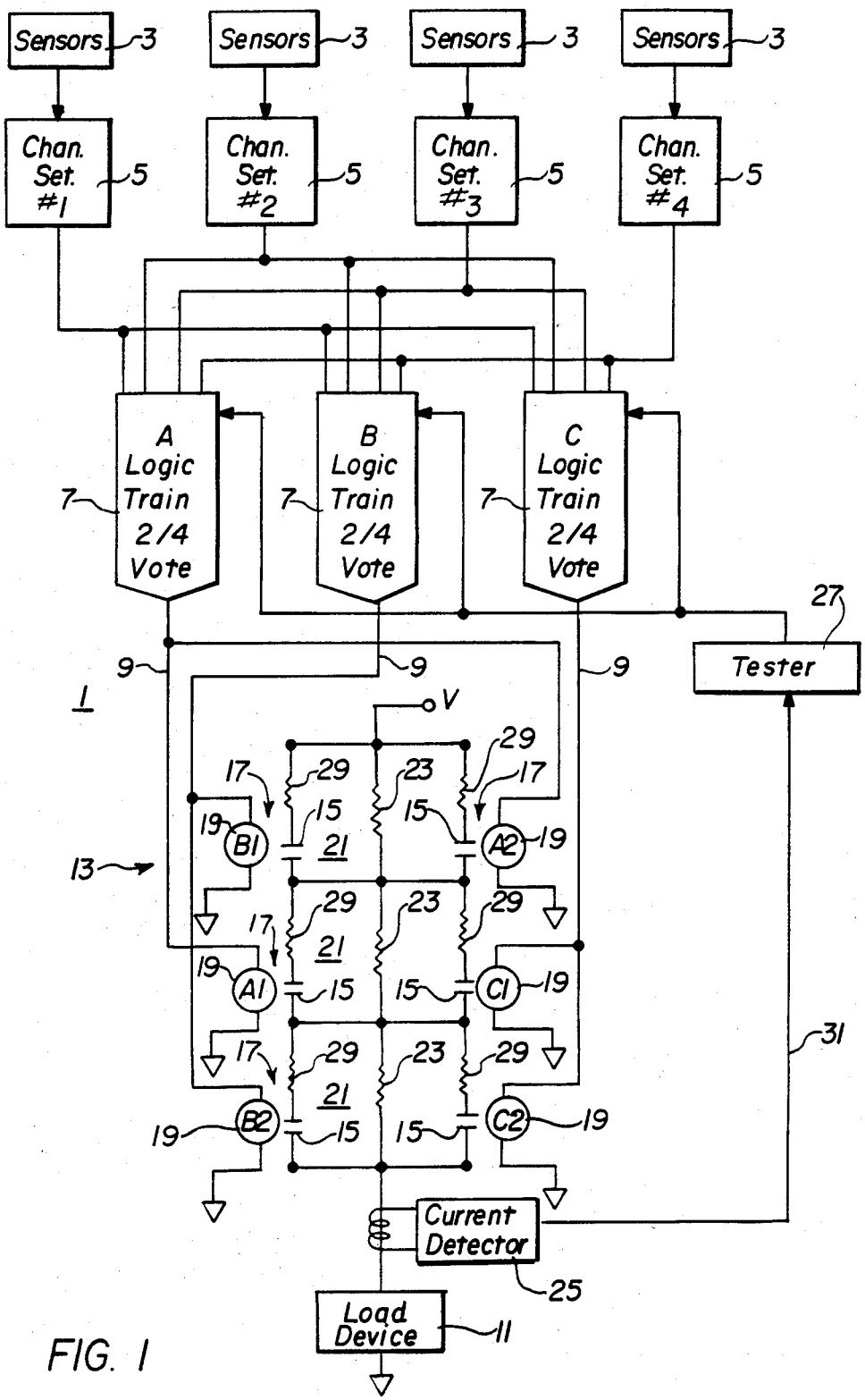
FIG. 1 is a schematic diagram of a protection system for a nuclear power plant incorporating the present invention which utilizes a normally deenergized load device.

The invention will be described as applied to the protection system for a nuclear power plant although it could also be incorporated into the protection system for many other types of complex processes. As shown in FIG. 1, the exemplary system 1 employs four redundant sets of sensors 3 to monitor selected plant parameters such as pressure, temperature, flow, radiation level, et cetera, and/or the status of various components, such as whether a valve is open of closed or whether a pump is running or not. Where such a system is used for a particular safeguard function, the sensors 3 may monitor only one or a plurality of plant parameters or conditions. The signals generated by each set of sensors 3 are applied to separate channel sets 5, numbered 1 through 4 in FIG. 1, where the detected values of the sensor signals are analized for an indication of an abnormal condition by comparing them with selected setpoint values. In some instances, the values of measured parameters are used to calculate other parameters which are then compared with limiting values for an indication of an abnormal condition as is well-known in the field of control system engineering. Each channel set generates a digital output signal which indicates whether or not the sensors in that channel set are sensing conditions which warrant actuation of the associated safeguard function. Since confirmation by more than one channel set is required to initiate the safeguard function, the digital signals are referred to as "partial actuation signals".

The partial actuation signals from each of the channel sets 5 are each applied to three independent logic trains 7 labeled A, B and C in FIG. 1. In order to provide separation between the redundant partial actuation signals, they are electrically isolated from one another such as by applying each of them to the coil of a separate relay in each logic train as is now common practice. The coil to contact separation of these relays provides the electrical isolation between the actuation signals and between the logic trains. Isolation could also be provided for instance, by optical isolators where solid state switches are used in place of relays.

The logic trains 7 independently vote the partial trip signals received from the four channel sets 5 and generate an actuation signal on their associated output lines 9 when the prescribed number of partial trip signals is detected. Typically, two out of four voting logic is employed by these logic trains. That is, two out of the four channel sets must be generating a partial actuation signal in order for the logic train to generate an actuation signal. Such a scheme allows for failures which preclude the generation of a partial actuation signal by two of the channel sets, while reducing the likelihood of a spurious trip which could occur if only one partial trip signal was required to generate an actuation signal. In the normal course of events, all four channel sets would generate partial actuation signals upon the occurrence of the abnormal condition, and all three logic trains 7 would generate an actuation signal. Of course, voting strategies other than two out of four could be employed by the logic trains 7.

The actuation signals on the leads 9 are utilized to control the energization of a load device 11 by a voltage source V through a power interface identified generally in FIG. 1 by the reference character 13. The load device may be any type of electrically operated device which effects an automatic response to the detection of the associated abnormal condition. Such a device could be for example, a pump, an electrically controlled valve, a heater, a circuit breaker or any motor driven device. In the system of FIG. 1, the load device would be a normally deenergized device, but as will be seen, the invention can also be used with normally energized load devices also.

The power interface 13 includes a network of switches connected in series with the load device 11 across the voltage source V. In the circuit of FIG. 1, the switches are the normally open contacts 15 of relays 17 individually identified as A1, A2, B1, B2, C1 and C2. The coils 19 of two relays 17 are connected to the output line 9 from each logic train 7. The contacts of these coils are connected in three groups 21 of two contacts each with the two contacts in each group connected in parallel and the groups connected in series. The two contacts in each group are associated with relays energized by different logic trains. Thus, the first group includes the make contacts of relays B1 and A2; the second, contacts of relays A1 and C1; and the third contacts of relays B2 and C2. Hence, it will be seen from FIG. 1, that for any combination of actuation signals generated on the lines 9 by two out of three of the logic trains 7, contacts will be closed in the power interface 13 to actuate the load device 11 by completing a circuit between the voltage source V and the device. With this power interface, protection against spurious actuations is provided by requiring confirmation of the abnormal condition by at least two of the logic trains, yet a failure in any one logic channel will not disable the system.

Figure 2:
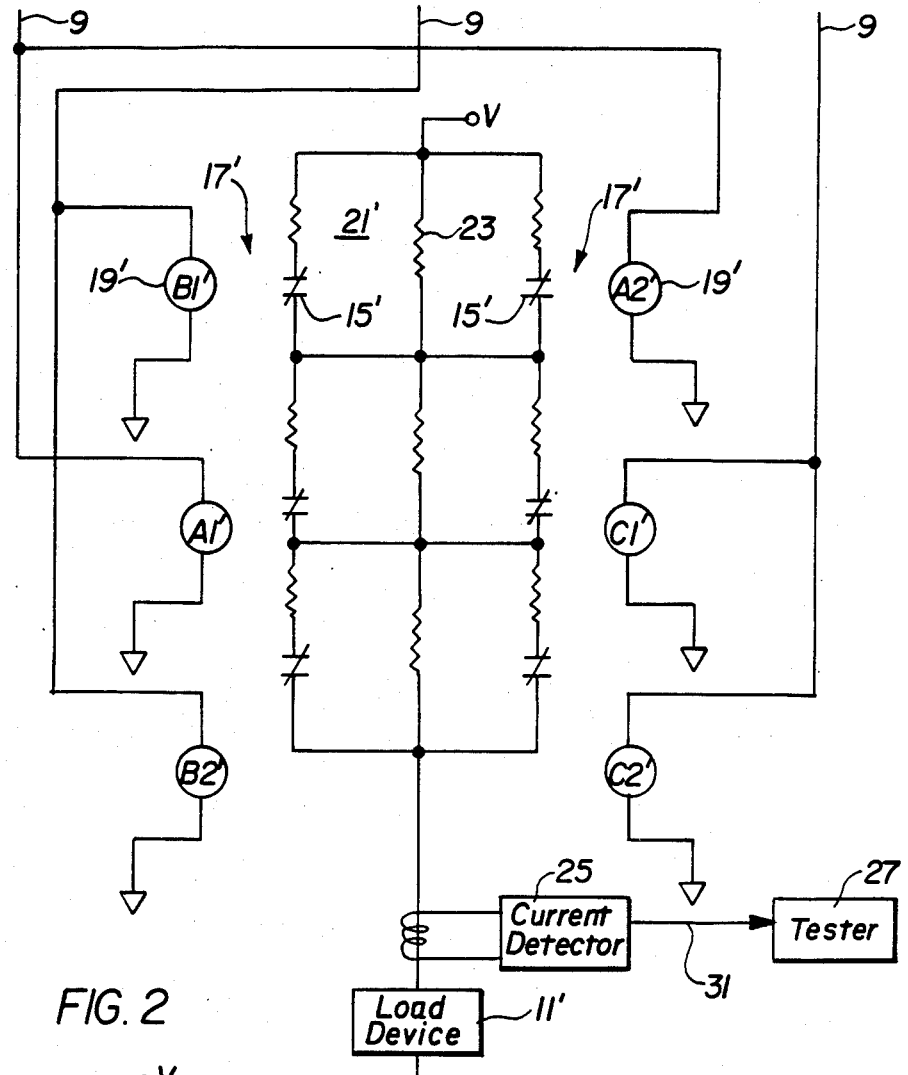
FIG. 2 is a schematic diagram of a portion of the protection system of FIG. 1 adapted for use with a normally energized load device.

Another advantage of the invention is that the same basic arrangement of the power interface can be used for normally energized as well as normally deenergized load devices. Thus, as shown in FIG. 2, the normally closed break contacts 15' of the two relays 17', the coils 19' of which are connected to each logic train actuation line 9, are arranged in three series connected groups of two contacts each in parallel. In this circuit, a path through the switching network 13' remains complete unless actuation signals are generated on two out of three of the lines 9. In this arrangement, the load device is actuated by interrupting the power to the load device 11'. Again, spurious actuations are reduced by requiring confirmation of two out of three of the logic trains and the system is not disabled by a single failure.

The present invention includes a unique arrangement for testing protection systems such as those disclosed in FIGS. 1 and 2. As shown in these figures, each group 21 or 21' of relay contacts is shunted by a resistor 23 which, because the three groups of relay contacts are connected in series, form a leakage path through the network 13 or 13'. A current detector 25 measures the current drawn from the voltage source by the load 11 or 11' and the switching network 13 or 13' including the leakage path through the resistors 23. The current detected by the current detector is applied to a tester 27 which analizes the detected current based upon test inputs to determine the condition of the tested components.

The resistance of the resistors 23, is sufficiently large that the leakage current through them is insufficient to energize the load device 11, 11' yet is large enough to be detected by the current detector 25. The value of these resistors 23 is also several magnitudes larger than that of the contact resistance of the contacts 15, 15' as represented by the resistances 29, 29' shown in series with the contacts, such that the current through the closed set of contacts 15, 15' is measurably larger than that through the associated shunt resistor 23.

With this arrangement, the power interface can be automatically tested without actuating the load device, whether it is normally energized or deenergized, and without changing the circuit topography, while continuously maintaining the protection function. Referring to FIG. 1, the tester 27 sends signals to one of the logic trains 7 at a time disconnecting the inputs from the channel sets 5 and substituting test signals. Various combinations of these test signals can be generated by the tester to test the logic train. Certain combinations of the test signals will generate an actuation signal on the associated actuation line 9 thereby energizing the associated relays. For instance, during testing of logic train A, relays A1 and A2 will be energized. The closing of the normally open contacts 15 of these relays will insert their contact resistance in parallel with the resistances 23 shunting the first two groups of contacts in the power interface 13, thereby lowering the total resistance in series with the load. This will result in an increase in current to the load which is detected by the current detector 25 and transmitted to the tester over line 31. Since neither of the contacts 15 in the lowest groups 21 of contacts is closed at this time, all of the current must flow through the associated resistor 23 so that even though the current increases, it is not high enough to actuate the load device 11. It will be appreciated that if one of the relays A1 or A2 should fail and its contacts do not close during the test, the current will increase over that with no logic trains actuated, but it will be less than if both relays operated properly since all of the current must flow through two of the resistors 23. Thus, the test sequence tests the operation of each of the relays in the power interface 13.

The other logic trains 7 are tested sequentially in a similar manner. During testing, the voting logic of the power interface 13 is transformed from two out of three logic to one out of two. That is, with one logic train generating an actuating signal induced by the tester, only one of the other logic trains need detect an abnormal condition for the load device to be actuated. For instance, with channel A under test, an actuation signal from either channel B or C will complete a low resistance path through the power interface to energize the load device 11. This transformation is achieved without any change in circuit topography. It also assures that the power interface is not disabled by a single failure in the remaining active channels during testing as in the prior art.

Testing of the circuit of FIG. 2, where the load device is normally energized, is carried out in a similar manner to that described in connection with FIG. 1. In this instance, actuation of relays during the test will lower the current. Again, failure of one of the relays to actuate will be detected by the tester, this time because the current will not be decreased as much as it should have had both relays operated as they should.

As an example of the operation of the circuits of FIGS. 1 and 2, the following table sets forth the currents that will be detected under the specified conditions where the value of the resistors 23 is 10K ohms, the resistance 29, 29' of the contacts 15, 15' is 1 ohm, the resistance of the load device 11, 11' is 500 ohms and the voltage V is 125 volts d-c.

| VOTER SWITCHING STATE | NORMALLY DE-ENERGIZED LOAD | | NORMALLY ENERGIZED LOAD | |
|---|---|---|---|---|
| | R | I [mA] | R | I [mA] |
| 0/3 Normal | 30KΩ All Open | 4 mA | 1.5Ω All Closed | 249.25 |
| ⅓ Test Position | 10KΩ | 12 mA | 2.5Ω | 248.75 |
| ⅔ Faulted Actuation | 2.5Ω | 248 mA | 10KΩ | 12 mA |
| 3/3 Normal Actuation | 1.5Ω | 249 mA | 30KΩ | 4 mA |
| Single Fault | 20KΩ One Switch Closed | 6 mA | 2Ω One Switch Open | 249.00 mA |

As can be seen from this table, the invention provides the capability of monitoring the performance of each logic train 7 and each switch 17 in the power interface network 13, 13'. It not only provides the capability of specifically testing each of the components but can also be used to provide on-line continuous monitoring of these components. For instance, when the plant is operating normally, a failure in a logic train which erroneously generates a single actuation signal on one of the actuation lines 9 would be detected by a change in load current. Similarly, a failure in any one of the switches 15, 15' in the power interface 13, 13' would also be detected by a change in load current. Even during an actuation of the load device by two out of three rather than all three logic trains would be detected.

Figure 3:
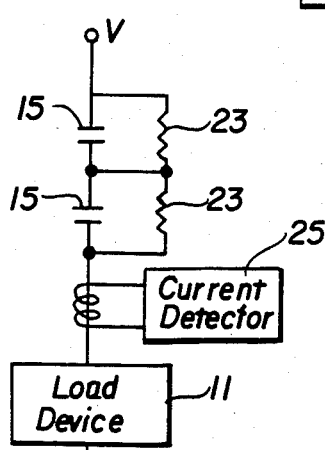
FIG. 3 is a schematic diagram of a two out of two voting power interface circuit for a normally deenergized load device incorporating the testing feature of the invention.
Figure 4:
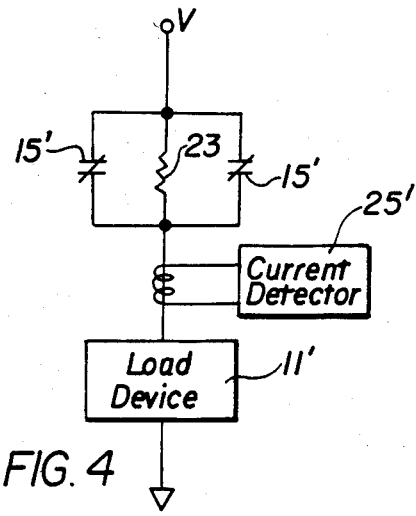
FIG. 4 is a schematic diagram of a two out of two voting power interface circuit for a normally energized load device incorporating the testing feature of the invention.

The arrangement for testing the power interface is not confined to testing a two out of three voting logic network. For example, it can also be used to test and monitor the prior art two out of two voting logic power interface for normally deenergized and normally energized loads as shown in FIGS. 3 and 4, respectively. In fact, it can be used for any power interface network having m sets of switches where the switches are arranged in a plurality of groups of switches connected in series with the load across the voltage source. Each group of switches comprises a different selection of n switches each from a different set of switches all connected in parallel such that with at least n sets of switches actuated, the load is actuated. A resistor, such as resistor 23, shunts each of the m groups of switches to provide the leakage path through the network. Applying this general description to the circuit of FIG. 1 where m=3 and n=2, it can be seen that there are 3 groups of switches connected in series and that each group includes a different selection of 2 switches each from a different set of switches connected in parallel so that with 2 out of 3 of the 3 sets of switches actuated, the load, whether normally energized or deenergized, is actuated.

While the invention has been described using relays as the switches, other switching devices could also be used, such as triacs, SCRs, or power MOSFETs. In the case of these solid state devices, the resistance 29, 29' represents the dynamic resistance of the device. These solid state switches may be isolated to maintain separation of the channels by for instance, opto-isolators or other suitable protection grade isolation devices.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A testable two out of three voted power circuit for the protection system of a complex process control system comprising:
   a load;
   a voltage source;
   three pairs of switches connected in three groups of two switches each with the two switches in each group associated with a different pair of switches and being connected in parallel, and with the three groups of switches being connected in series with each other, and with the load across the voltage source;
   means for generating three independent actuating signals;
   means for applying a different one of said actuating signals independently to one of said pairs of switches to actuate the same, and thereby actuate the load device only if at least two out of the three actuating signals are generated;
   a resistor shunting each group of switches to provide a leakage path between the voltage source and the load device; and
   a current detector for measuring the current drawn from the voltage source, the impedance of said resistors being several magnitudes larger than the impedance of a closed switch such that the current through the leakage path is insufficient to energize the load but sufficient for the current measuring means to detect whether a switch is actuated, whereby the operation of the switches can be tested without actuating the load device by separately generating one actuating signal at a time.

2. The power circuit of claim 1 wherein said load is a normally energized device and wherein the switches are normally closed devices which are open when actuated by the associated actuation signal, such that the load is normally energized and is deenergized by the generation of at least two out of three actuation signals.

3. The power circuit of claim 1 wherein said switches are normally open devices which are closed when actuated by the associated actuation signal, such that the load is normally deenergized but is energized by the generation of at least two out of the three actuation signals.

4. A protection system for a nuclear reactor comprising:
   redundant sets of detectors for monitoring preselected reactor parameters and operating conditions and for generating redundant partial actuation signals in response to preselected values and conditions;
   three independent logic trains, to each of which each redundant partial actuation signal is applied, said logic trains each generating an actuation signal in response to a preselected number of the redundant partial actuation signals;
   a load;
   a voltage source;
   three pairs of switches connected in three groups of two switches each with the two switches in each group associated with a different pair of switches and being connected in parallel, and with the three groups of switches being connected in series with each other and with the load across the voltage source;
   means for applying a different one of said actuating signals independently to each of said pairs of switches to actuate the same, and thereby actuate the load when at least two out of the three actuation signals are generated;
   a resistor shunting each group of switches to provide a leakage path between the voltage source and the load device; and
   a current detector for measuring the current drawn from the voltage source, the impedance of said resistors being several magnitudes larger than the impedance of a closed switch, such that the current through the leakage path is insufficient to energize the load, but sufficient for the current measuring means to detect whether a switch is actuated.

5. The system of claim 4 wherein the load is a normally deenergized device and the switches are normally open and are closed when actuated by the associated actuation signal.

6. The system of claim 4 wherein the load is a normally energized device and the switches are normally closed and are opened when actuated by the associated actuation signal.

7. In combination, a load, a voltage source, and a switching network connected in series with the load across the voltage source, said switching network including at least two switches both of which must be actuated to operate the load, the improvement comprising test means for testing said switches without actuating said load and comprising resistance means shunting each switch and being connected in series with the load and voltage source to provide a leakage path across the switching network; current measuring means to measure the current drawn from the voltage source, said resistance means having an impedance several magnitudes larger then the impedance of a closed one of said switches such that the leakage current is insufficient to energize the load but sufficient for the current measuring means to detect whether a switch is actuated; and means to actuate one of said switches at a time to effect a change in the current detected by the current detector when said actuated switch operates without actuating said load.

8. The combination of claim 7 wherein said network comprises m sets of switches arranged in a plurality of groups of switches with each groups of switches connected in series with the other groups and said load across said voltage source, each said group of switches comprising a different selection of n switches connected in parallel, each from a different one of said m sets of switches, said plurality of groups of switches comprising all possible different combinations of switches from said m sets taken n at a time, such that with at least n out of said m sets of switches actuated the load is actuated, and said resistance means comprises a resistor shunting the switches in each group of switches.

9. The combination of claim 8 wherein said load is a normally deenergized device and said switches are normally open devices which are closed when actuated.

10. The combination of claim 8 wherein said load is a normally energized device and said switches are normally closed devices which are opened when actuated.

11. A method of testing a power circuit for a protection system in a complex process control system without interrupting the protection function where the power circuit includes m sets of switches arranged in a plurality of groups of switches with each group of switches connected in series with the other groups and with a load across a voltage source, each group of switches comprising a different selection of n switches connected in parallel each from a different one of said m sets of switches, such that with at least n out of said m sets of switches actuated the load is actuated, said method comprising the steps of:
   shunting each of said groups of switches with a resistor to form a leakage path through said arrangement of switches, the resistance of said resistors being several magnitudes larger than that of a closed switch, such that the current through the leakage path is insufficient to actuate the load but sufficient to be measurably changed by actuation of a switch;
   actuating one of said m sets of switches; and
   measuring the effect such actuation has on the current drawn from the voltage source.

12. The method of claim 11 including determining the current drawn from the voltage source for predetermined patterns of actuation of said switches during operation of said protection system, monitoring the current drawn from the voltage source, and comparing the monitored current with the current determined for the existing pattern of actuation of said switches to determine whether all of the switches have been actuated in accordance with the existing pattern of actuation.

* * * * *